Figure 1:
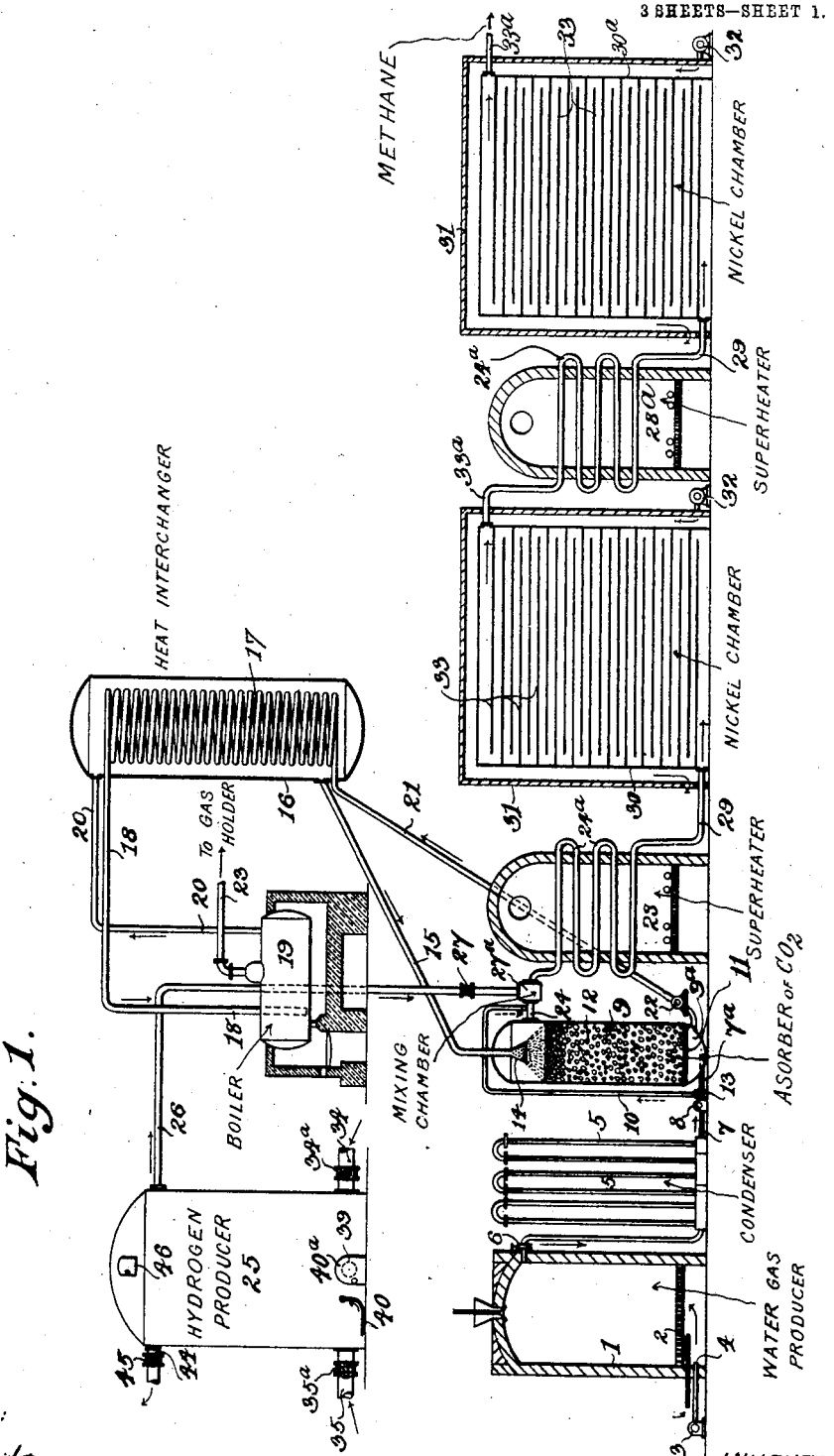

No. 777,848. PATENTED DEC. 20, 1904.
H. S. ELWORTHY.
APPARATUS FOR THE MANUFACTURE OF GAS.
APPLICATION FILED JAN. 21, 1903.
NO MODEL. 3 SHEETS—SHEET 3.

No. 777,848.

Patented December 20, 1904.

UNITED STATES PATENT OFFICE.

HERBERT SAMUEL ELWORTHY, OF LONDON, ENGLAND, ASSIGNOR OF ONE-HALF TO ERNEST HENRY WILLIAMSON, OF LONDON, ENGLAND.

APPARATUS FOR THE MANUFACTURE OF GAS.

SPECIFICATION forming part of Letters Patent No. 777,848, dated December 20, 1904.

Application filed January 21, 1903. Serial No. 139,941.

*To all whom it may concern:*

Be it known that I, HERBERT SAMUEL ELWORTHY, consulting chemical engineer, of Dashwood House, New Broad street, London, England, have invented certain new and useful Improvements Relating to the Manufacture of Gas for Illuminating, Heating, and Power Purposes, of which the following is a specification.

This invention relates to the manufacture of a gas consisting chiefly of methane or marsh-gas.

It is well known that the ordinary coal-gas of commerce owes its high calorific value to the presence of methane, which usually forms about thirty per cent. of that product. Natural gas, the high calorific value of which is so well known, frequently consists almost entirely of methane.

By the present invention I am enabled to manufacture a gas consisting chiefly of methane from water-gas by first forming a suitable mixture of carbon monoxid, carbon dioxid, and hydrogen, or a mixture of hydrogen with either one of the above oxids of carbon (adding hydrogen where necessary) and then passing such mixture of gases over finely-divided nickel at a suitable temperature. I prefer to obtain this mixture of oxid or oxids of carbon and hydrogen by the process hereinafter described. In general, however, I prefer to proceed in the manner first to be detailed, though I do not confine myself to this particular method.

Methane consists of hydrogen and carbon in the proportions represented by the formula CH$_4$. In order, therefore, to obtain this gas, it is necessary to have a sufficient quantity of hydrogen present in the mixture not only to combine with the carbon to form the methane, but also to combine with the oxygen liberated from its combination with the carbon.

Water-gas made in the ordinary way consists principally of a mixture of carbon monoxid and hydrogen in nearly equal volumes, together with a small quantity of nitrogen and carbon dioxid. Now for my purpose it is necessary to have about three volumes of hydrogen to one volume of carbon monoxid in order to obtain the reaction represented by the equation

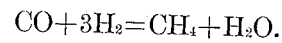

If, however, the water-gas is so made as to consist largely of carbon dioxid and hydrogen, then it is necessary to have about four volumes of hydrogen to one volume of carbon dioxid in accordance with the equation

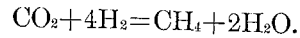

In the method of manufacturing water-gas generally adopted it is essential to raise the proportion of carbon monoxid to the highest limit obtainable and to keep down the proportion of carbon dioxid to the lowest limit. For the purpose of my invention, however, this is more or less a matter of indifference, as I can utilize the one as well as the other. Therefore, while in the ordinary well-known process of water-gas manufacture (except in the case of the Dellwik-Fleischer process) the blowing method is generally twice as long, at least, as the steaming process, in the case of my invention the steaming period may be very considerably increased, and consequently a far greater quantity of water-gas obtained at each reversal, thereby effecting a very great saving of fuel now lost during the prolonged blowing-up periods. Having obtained the water-gas, conveniently this modified water-gas, I proceed to secure the necessary quantity of hydrogen to bring up the proportions to those stated above, according to the composition of the water-gas mixture. In order to do this, I may obtain my hydrogen by any of the well-known processes, as by electrolysis of water, in which case the oxygen may be collected for commercial use; but I prefer to obtain it by the reaction of steam upon metallic iron, whereby at a suitable temperature the steam is decomposed, the hydrogen liberated, and the iron converted to the state of magnetic oxid in accordance with the equation.

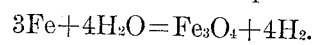

I preferably effect the production of the hydrogen required for admixture with the water-gas, as above mentioned, by the action of steam on iron in a more economical manner than has hitherto been known. This I effect by storing up the heat produced in one part of the hydrogen-making process—namely, the reduction to the metallic state of the magnetic oxid of iron produced during the hydrogen-making stage—and I thus render that heat available to assist in the carrying out of that reaction. I may effect this by placing the metallic iron or iron oxid in the form of powder on trays in a suitable furnace, said trays being formed of fire-clay and acting in the same manner as the ordinary fire-brick filling used in the Cowper or Whitwell regenerative stoves. In this way great economy results, and the iron being in the form of a fine powder is readily acted upon in both stages. Neither does it deteriorate in the same way as when iron ore or iron scraps are used, as furnaces in which these latter are used tend to close up from formation of the powdered oxid. In the improved furnace this powder is an advantage, whereas in other forms it is a disadvantage. The fire-brick trays are or may be of rectangular shape, having a retaining-rib at two or more of their edges for containing the powder and mounted on short legs or supports. They are built up one upon another in the furnace in such manner as to allow the gases to pass freely, but by a circuitous pathway, through the furnace. The furnace is preferably heated internally, and to this end it may be also so constructed with a combustion-chamber in the base that it can in the first place be heated to the required extent by gas-firing either with producer, water, or coal gas. It may, however, be constructed without this combustion-chamber in the base and heated by means of hot air or heated products of combustion from another source, preferably by a hot-air blast from an ordinary regenerative stove, and this stove may be the one in which the steam which has to be passed over the iron for the production of hydrogen is superheated at a later stage, as hereinafter described. I may also arrange the iron-furnace so that it can be heated internally both by gas-firing and by hot blast of air or heated products of combustion. In order to facilitate the production of the hydrogen by contact of steam with iron, a reaction in which a considerable absorption of heat takes place in addition to heating the retorts or furnaces containing the iron the steam used for the reaction may be very highly superheated in regenerative blast-stoves, such as the well-known Cowper or Whitwell stoves so largely used in the iron industry, or in an apparatus such as described in English Patent No. 25,007 of 1897. The iron should be in a finely-divided state, but may be in porous lumps, if desired. In order to reduce the oxid of iron to the metallic state, and thus render it available for reuse, I may pass a certain quantity of the producer-gas made during the blowing-up stage of the water-gas process or in other convenient way over it at a high temperature, whereby the carbon monoxid contained in that gas, assisted by the small proportion of hydrogen generally present, reduces it in accordance with the equation $$Fe_3O_4 + 4CO = 3Fe + 4CO_2,$$

the hydrogen being at the same time converted into water. When using producer-gas for the reduction of the iron, it is advisable to superheat the producer-gas, as in this manner greater heat is produced and stored up in the iron-containing furnace for use in the hydrogen-making part of the process. The carbonic acid made in this reduction of the iron oxid by producer-gas can, if required, be collected and further purified by any suitable process, such as absorption by carbonated alkalies either in the moist state or in solution, and finally recovered from these by boiling the solution or passing superheated steam over the moist bicarbonate. Instead of using the producer-gas for reducing the oxid of iron I may use a portion of the water-gas or the gas from a separate gas-producer preferably worked by means of a steam jet-blower, as a certain proportion of hydrogen assists in the reduction of the iron oxid by the carbon monoxid.

The hydrogen having been mixed with the water-gas in suitable proportion, as before mentioned, and assuming the water-gas to contain both oxids of carbon, I proceed to pass this mixture of gases over finely-divided nickel, whereby the carbon is hydrogenized and the oxygen liberated is converted into water by the excess of hydrogen present. The nickel apparently takes no part in the reaction, as at the end of the operation it remains unaltered, the reaction belonging apparently to the so-called "catalytic" or "contact" order. It is probable, however, that at an intermediate stage the reaction discovered by Ludwig Mond takes place—viz., the production of nickel carbonyl—but this will be immediately decomposed by the comparatively high temperature at which the process is worked. Although iron also forms a compound with carbon monoxid in a similar manner to nickel, it does not appear to have the power of hydrogenizing the carbon. The nickel may simply be placed in layers in the powdered state upon suitably-arranged shelves in the retort, chamber, or other vessel, or it may be caused to adhere to the surface of some porous material, as broken fire-brick, pumice-stone, or asbestos fiber, an agglutinating and not easily fusible substance being used—such as pipe-clay, fire-clay, magnesium chlorid, or other suitable material—or the finely-divided nickel itself may be made up into balls or blocks of any suitable size by being mixed with an agglutinating material and preferably, also, with some organic material, such as sawdust, which can easily be burned away, leaving the blocks more porous, or the nickel may be in the form of wire gauze or foil or other suitable form, so as to present a large surface to the gases. The finely-divided nickel as produced by the Mond reaction is especially suitable for the purposes of this invention. The nickel, however prepared, is placed in a retort, tower, or chamber, which may be heated internally or externally by any suitable means to the required temperature—say, for example, 250° centigrade for the carbon monoxid and 350° for the dioxid—and the gases may also be heated before admission to the chamber. Instead of heating the chamber itself the gases before admission may be heated to the required temperature, and I prefer this method because in this manner the reaction is more under control, as hotter or colder gas can be admitted at any stage of the reaction, so as to control the temperature. The reaction is strongly exothermic, and it is therefore advisable to be able to readily control the temperature, because should the temperature rise too high the monoxid will be decomposed into carbon and not converted into methane. I may control the temperature, as before described, by admitting the reaction-gases at a higher or lower temperature, as required, or with the same object I may admit to the nickel-chamber at any suitable stage a certain volume of steam or water spray, or it may be a certain volume of cold methane. If steam be employed, it can be condensed, so that the resulting methane will not be contaminated thereby, or with the same object of controlling the temperature of the reaction I may circulate a definite volume of water or cold air or other gas through coils of pipe in the chamber or in a hollow casing surrounding said chamber, or it may be through hollow shelves, upon which the nickel rests. As the temperature of the reaction with carbon monoxid is lower than the reaction with carbon dioxid, the process may be conducted in two stages, the first stage at the lower temperature to convert the carbon monoxid to methane and the latter stage at a higher temperature in order to convert the carbon dioxid to the methane, and the gases may be reheated during the intermediate stage. The two stages are preferably conducted in separate chambers. The methane is collected in a gas-holder for use.

There are several modifications which may be adopted, if desired, under certain circumstances. By suitable steaming during the water-gas process—i.e., by stopping the steaming at the required point—a gas having approximately the composition $CO_2 + CO + 3H_2$ may be obtained, and from this the carbon dioxid may be removed by any well-known method, such as those detailed below, though I do not confine myself to these. After the removal of the carbon dioxid the mixture of carbon monoxid and hydrogen is in the right proportion for the production of methane. Any of the following methods may be used for the removal of the carbon dioxid:

First. It may be passed over slaked lime, whereby carbonate of lime is produced, and the lime may be revivified by any process, such as Hislop's.

Second. The gases may be passed over an alkaline carbonate or through a solution of these salts, and the carbonic acid may be recovered from the moist salts by passing superheated steam over them, or it may be recovered from the solution by boiling. In either case the monocarbonate is regenerated and the carbon dioxid recovered in a very pure state and suitable for commercial utilization when compressed to the liquid state or solidified, as may be done by the process described under English Patent No. 7,436 of 1895. In the solid state the carbonic acid will have important uses for refrigeration, &c.

Third. The carbon dioxid may be removed from the mixed gases by absorption in water. This may be done in the manner described in the specification of English Patent No. 7,281 of 1895, which is a continuous process, or it may be removed by compressing the gas alternately into two vessels connected by means of a three-way valve, these vessels being fitted with agitating devices, and the compressed mixture of gases is forced into one end of the vessel, the carbon dioxid absorbed during its passage to the other end, and the insoluble hydrogen and carbon monoxid escaping through a suitable valve at the opposite end, where they are collected and conveyed to a storage-holder. When the pressure in the vessel reaches a set limit, such as five to ten atmospheres, the three-way valve is automatically reversed and the compressed gases pass into the other vessel. At the same time the outlet-valve for the insoluble gases is closed and an escape-valve for the carbon dioxid opened, and this is rapidly given off from the water as the pressure is lowered, while this liberation is facilitated by the agitation being continued. The $CO_2$ so liberated may be collected for use and may be further purified from the remaining traces of hydrogen and carbon monoxid by passing over copper oxid, as fully described in the specification of English Patent No. 25,007 of 1897.

Instead of manufacturing the water-gas in the ordinary manner, as described above, when a very pure methane free from nitrogen is required the water-gas may be made in the manner fully detailed in the specification of English Patent No. 25,007 of 1897, above mentioned, in which the steam is superheated to such a degree, by passing through modified Cowper or Whitwell stoves, that on coming in contact with the fuel it is decomposed into carbon monoxid, carbon dioxid, and hydrogen.

It may be advisable after a certain time to revivify the nickel, and this may be done by passing air at a high temperature over it to oxidize the metal and then reducing it by means of hydrogen, or instead of this process the method of converting it into nickel-carbonyl by passing CO over it at a lower temperature may be used, the nickel liquid compound passing away into another chamber or retort, where it is decomposed by raising the temperature, and the CO liberated can be used over again to volatilize a further quantity of nickel.

There are various economies which may be introduced at different stages of the process in order to save otherwise waste products. During the blowing-up stage of the water-gas part of the process a very large quantity of producer-gas is generated, and that part of it which is not required for the reduction of the iron oxid, where the iron process of hydrogen production is used, may be utilized either for steam raising or, preferably, for driving gas-engines of the type now coming so largely into use in England and on the Continent for working with the waste gases from the blast-furnaces in the iron and steel industry, many of these engines now being made to deliver fifteen hundred to two thousand horse power. The power so obtained may be utilized in any manner, as for the production of electricity, and this latter may be used for any commercial purpose—such as driving machinery, electrochemical processes, lighting, or for the decomposition of water for the production of hydrogen and oxygen—the former of which may be utilized in my process and the latter collected and used for any commercial purpose. Where the process of separating the carbonic acid by absorption is used, the power generated in the above manner may be used for compressing the mixed gases and also for liquefying the purified carbonic acid obtained in any of the processes detailed hereinbefore. The producer-gas may also be utilized for the heating of the regenerative stoves, as mentioned above, which stoves may be used for superheating the steam used in various parts of the process and also for heating the mixed gases before passing them over the nickel. Both the producer-gas and the water-gas may also be caused to pass direct from the producer through any suitable form of heat-interchanger in which its sensible heat is given up, and this heat may be used for any required purpose. Should a process for making the water-gas similar to the Dellwik-Fleischer process be used, in which practically no producer-gas is made, the heated products of combustion, as well as the hot-water gas, may be used either by means of a heat-interchanging device or for steam raising or superheating.

Another method of working the water-gas part of the process and obtaining the requisite proportion of hydrogen is as follows: By carrying on the steaming part of the water-gas process until the gas has approximately the composition $2CO+CO_2+4H_2$ a mixture is obtained which when the CO is removed will be in the right proportion for producing the methane. In order to do this, I make use of the Mond reaction by passing the mixed gases at a suitable temperature over the finely-divided nickel, thus combining the CO with the nickel in the form of the liquid known as "nickel-carbonyl," the $CO_2$ and hydrogen passing on and being carried over a further quantity of nickel at a higher temperature. The nickel-carbonyl is itself decomposed by slightly raising its temperature, metallic nickel and carbon monoxid being reproduced. The recovered carbon monoxid can be used in any required way, such as mixing it with the methane in the proportion allowed by law or using it for fuel or for power production by means of gas-engines. It may also be mixed with the producer-gas formed during the blowing-up stage in order to increase its fuel value or calorific power. This method also provides a ready means of revivifying the nickel when its power of catalytic action is exhausted.

Instead of simply heating the nickel-carbonyl to decompose it into metallic nickel and carbon monoxid, as just described, I may mix the said nickel-carbonyl with a suitable proportion of hydrogen gas, obtained in the particular manner hereinbefore described or in any other suitable way, and pass said mixture through a heated chamber or otherwise subject it to a suitable temperature to cause such mixture of hydrogen and nickel-carbonyl to be transformed, substantially, into metallic nickel, methane, and water. A suitable proportion of hydrogen for this purpose would be approximately twelve volumes for each volume of the nickel-carbonyl, and a suitable temperature for the reaction would be about 250° centigrade. It will be readily understood that the hydrogen may be admitted at the required temperature to the nickel-carbonyl, and a special heating-chamber may thus be dispensed with.

The accompanying drawings illustrate apparatus embodying the present invention and suitable for the production of a gas consisting largely of methane from water-gas, as above described, taking as examples the methods hereinbefore described in which a water-gas is produced consisting, substantially, of a mixture of monoxid and dioxid of carbon and hydrogen, the dioxid being either removed or not and hydrogen being added, if necessary, to bring the proportion thereof up to that necessary to substantially transform the oxid or oxids of carbon into methane and water.

The practical application of the invention as regards the other modifications above described will then be readily understood by those skilled in the art.

Figure 2:
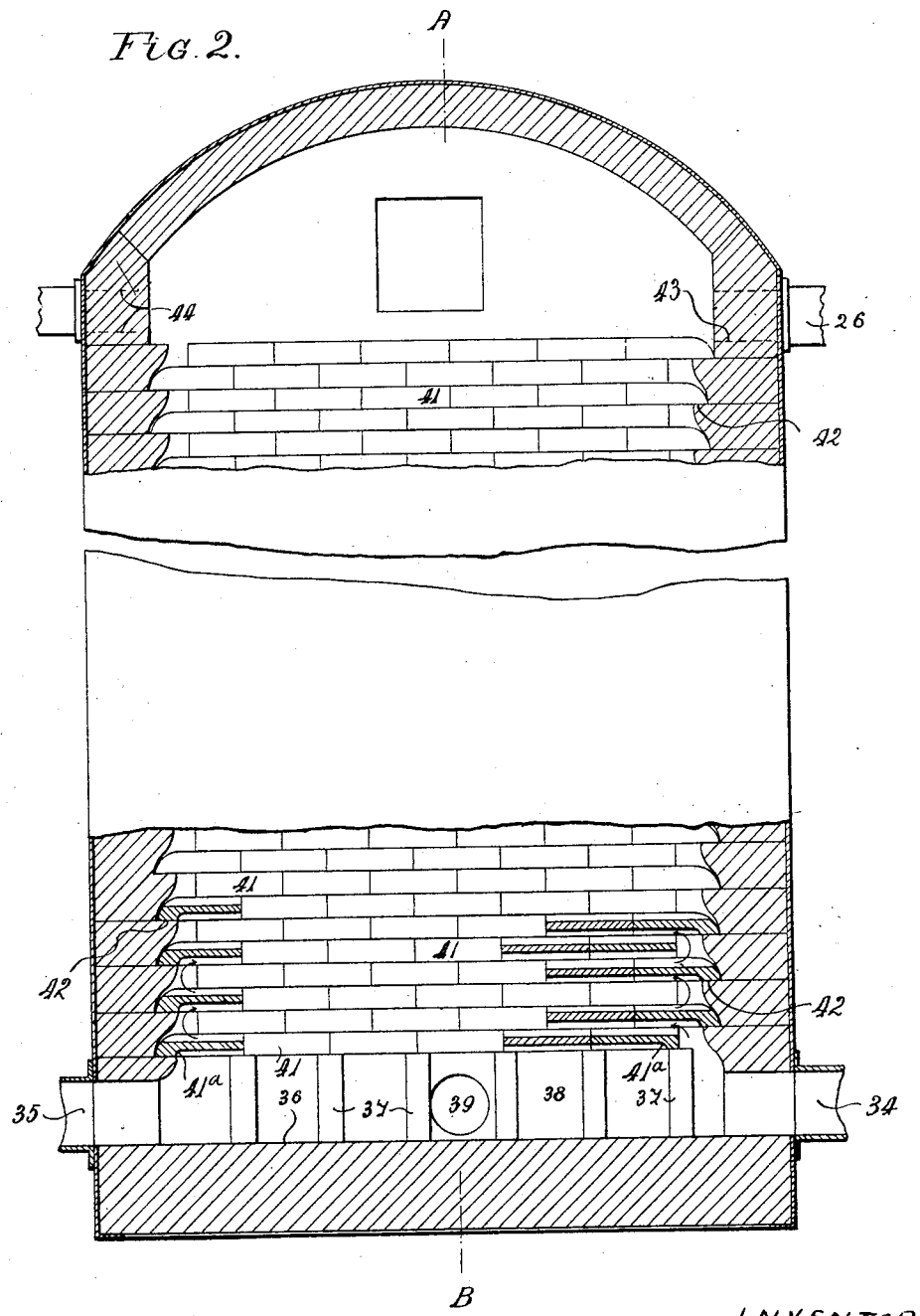
Figure 3:
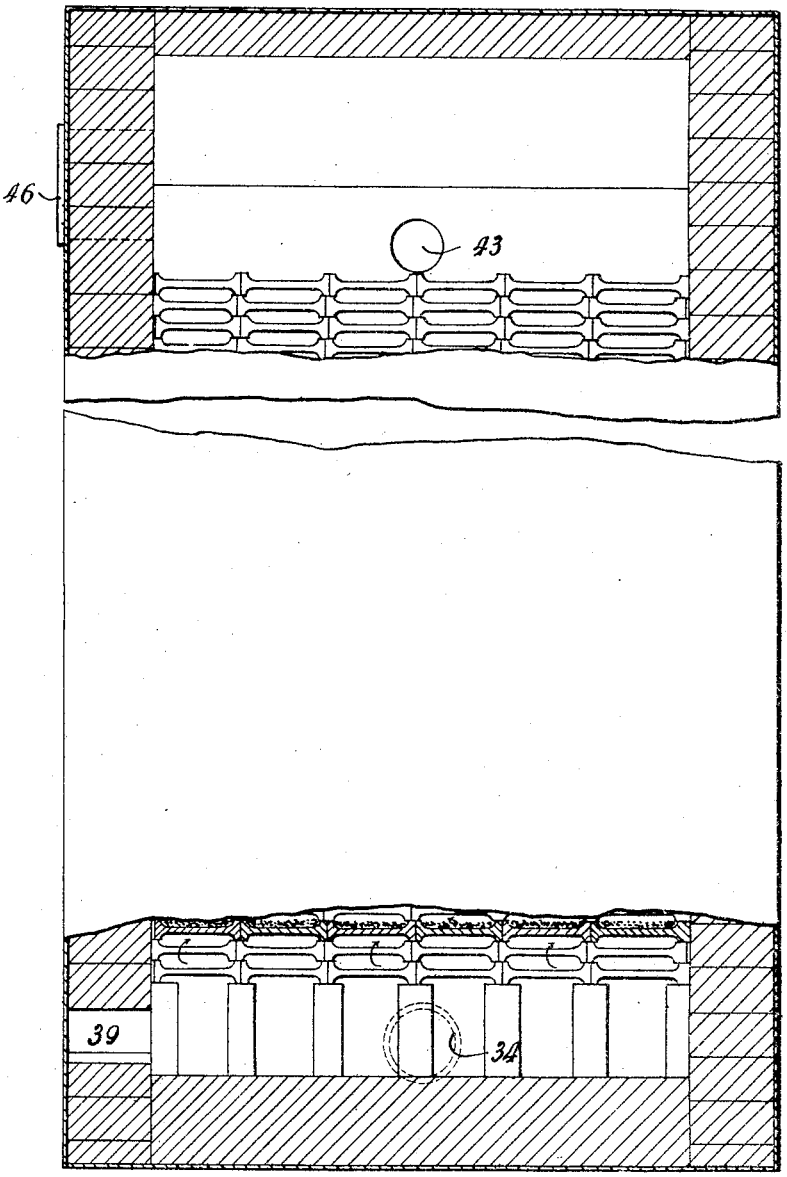

In the drawings, Figure 1 is a diagrammatic view of a plant suitable for carrying out the invention as before mentioned. Fig. 2 is a sectional side elevation, on an enlarged scale, of the improved hydrogen-producer constructed to embody the improvements hereinbefore described, a few of the end trays being shown in section. Fig. 3 is a sectional front elevation of the hydrogen-producer, partly in transverse vertical section, on the line A B of Fig. 2.

1 is the water-gas producer, which may be of any ordinary or suitable construction. 2 is the steam-inlet thereto; 3, the air-blower, delivering the air-blast thereto, when required, by the inlet 4.

5 is a condenser through which the water-gas passes on leaving the producer 1, a regulating-valve 6 being interposed to open, close, or regulate the flow of gas, as required.

7 is a pipe leading from the condenser, and 8 is a blower for drawing the gaseous mixture from the condenser and forcing it through the system.

13 is a three-way cock whereby the gaseous mixture may be directed through the pipe $7^a$ to the carbon-dioxid absorber 9 or led by the pipe 10 direct to the pipe 24 beyond the absorber 9, according as it is desired to remove the carbon dioxid from the gaseous mixture or not. The carbon-dioxid absorber is shown as of cylindrical form with domed ends. It is provided at bottom with a perforated false bottom or grid 11, upon which is supported a sufficient depth of broken fire-brick, coke-breeze, or the like 12. When the cock 13 is turned to direct the gases to the absorber, they are delivered by the blower 8, through the pipe $7^a$, to the space $9^a$ below the false bottom 11 and rise up through the material thereon.

14 is a spraying-head attached to a pipe 15 and serving to spray a solution of carbonate of potash upon the surface of the coke or other material in the absorber. The pipe 15 leads from the casing of a heat-interchanger 16, containing a coil 17, the upper end of which leads by a pipe 18 to a boiler 19, the pipe 18 dipping down to near the bottom of said boiler. Another pipe, 20, leads from the top of the casing of the heat-interchanger 16 to the top of the boiler 19. The bottom of the coil 17 communicates, by a pipe 21, with the chamber $9^a$ of the absorber 9, a circulating-pump 22 being interposed between the coil 17 and said absorber. The pump 22 serves to draw the solution of bicarbonate of potash resulting from the absorption of the carbonic acid by the carbonate-of-potash solution from the bottom of the absorber 9 and delivers it through the pipe 21, coil 17, and pipe 18 to the boiler 19, where the carbon dioxid is driven off by the heat of the furnace and passes away from the crown of the boiler by a pipe 23 to a suitable gas-holder or other apparatus for use as and when required The regenerated carbonate-of-potash solution passes from the top of the boiler, by the pipe 20, through the casing of the heat-interchanger 16, where it heats up the cool solution in the coil 17, being itself cooled by the incoming bicarbonate-of-potash solution, and passes by the pipe 15 to the top of the absorber 9, where it is sprayed over the coke or fire-brick filling by the spraying-head 14. In this way a solution of carbonate of potash is continuously delivered to the absorber, where it meets the gaseous mixture and absorbs the carbon dioxid therefrom, the resulting solution of bicarbonate being passed through the heat-interchanger to the boiler, so that the dioxid is usefully recovered and the heat is advantageously economized.

24 is a pipe to which the gaseous mixture passes from the top of the absorber 9, (or direct by the pipes 7 and 10, as the case may be.)

25 is the hydrogen-producer. (Shown in detail in Figs. 2 and 3 and more fully hereinafter described.) 26 is a pipe leading from the upper part thereof, by which the hydrogen generated passes to the mixing-chamber $27^a$, into which the pipe 24 likewise delivers, so as to effect the proper admixture of the gases therein. A regulating-valve 27 is interposed in the pipe 26 to permit the supply of hydrogen to be regulated, so as to adjust the hydrogen in the ultimate mixture to the desired proportion, as before explained, or to allow of the hydrogen being shut off when it is not required to mix the same with the gases passing to the nickel chamber or chambers or for other purpose, as required. The mixing-chamber $27^a$ is connected to a coil or serpentine $24^a$, arranged in a superheater 28, arranged to be heated by gaseous or solid fuel, as desired, and provided with suitable valves or equivalent means for regulating the temperature. In its passage through this coil or serpentine the gaseous mixture is heated to the proper temperature to insure the desired reaction between said mixture and the nickel in the nickel-chamber when it is delivered thereto. From the coil or serpentine $24^a$ the mixture passes, by a pipe 29, to the nickel-chamber 30. The nickel-chamber is of rectangular form and is shown as constructed with an air-casing 31, through which air may be circulated by a pump 32, when required, so as to control the temperature within said chamber. The nickel (in any of the forms hereinbefore described) is carried on trays 33, superposed in baffled order in the chamber in such manner that the gaseous mixture passes up in a serpentine course over each of the trays successively from bottom to top and is brought into intimate contact with the nickel thereon. The methane produced in the nickel-chamber 30 passes off from the top of said chamber at $33^a$, whence it may be led to a gas-holder, or when a mixture of carbon monoxid, carbon dioxid, and hydrogen is employed in the reaction the resulting mixture of methane, carbon dioxid, and hydrogen is preferably led through a second superheater $28^a$ and a second nickel-chamber $30^a$, similar to those just described, before passing to the gas-holder.

Let us assume, by way of example, that it is desired to produce a water-gas consisting, substantially, of carbon monoxid, carbon dioxid, and hydrogen, wherein the monoxid and hydrogen are present in such proportion that on removal of the dioxid the monoxid and hydrogen shall remain in sufficient proportion for their substantial transformation in the nickel-chamber into methane and water, as before explained. The working of the apparatus will then be as follows: As the water-gas is produced in the producer 1 the valve 6 is opened, three-way valve 13 is turned to direct the gases to the absorber 9, the regulating-valve 27 is closed, and the blower 8 and circulating-pump 22 are set in operation. The mixture of hydrogen, carbon monoxid, and carbon dioxid is drawn by the blower through the condenser 5 and delivered to the absorber 9, rising through the coke or fire-brick and the descending stream of carbonate-of-potash solution therein, whereby the carbon dioxid is absorbed. The remaining gases then pass through the coil or serpentine in the superheater 28, the temperature in the superheater being regulated to heat said gases to the proper temperature for the monoxid reaction—for example, 250° centigrade. The gases then pass to the nickel-chamber 30, where they are transformed into methane and steam, the mixture of methane being passed through a condenser, (not shown,) where the steam is condensed, and the methane then passes to the gas-holder, as above explained. Should the temperature in the nickel-chamber rise too high, this is rectified by pumping air through the casing 31 or spraying water into said casing or in other suitable way. It is of advantage to maintain the temperature in the chamber by this means at or slightly above that necessary for the reaction.

Let us assume another case—namely, that in which water-gas consisting, substantially, of carbon monoxid, carbon dioxid, and hydrogen is produced, additional hydrogen being then mixed therewith to bring the hydrogen up to the proper proportion, the resulting mixture being caused to react with the nickel to produce methane. In this case the apparatus would be operated as follows: Cock 6 is opened, three-way valve 13 turned to pass the gaseous mixture from the condenser to pipe 24 direct, and regulating-valve 27 adjusted to deliver the hydrogen to the mixing-chamber $27^a$ in proper proportion. The blower 8 is set in operation, but the circulating-pump 22 is of course not run. The mixture of gases passes through the coil in the superheater 28, the heat wherein is regulated to a suitable temperature for the monoxid. Thence they pass to the nickel-chamber 30, where the monoxid and part of the hydrogen are converted into methane and water. The resulting mixture of gases then passes through the coil or serpentine in the second superheater $28^a$, the heat of which is adjusted to a suitable temperature to insure the reaction of the carbon dioxid and hydrogen—say 350° centigrade—and the gases thus heated are passed through the second nickel-chamber $30^a$ and thence through a condenser to the gas-holder, as before, the temperature in the nickel-chambers being kept within the proper limits, as before described. In any case, as will be readily understood, hydrogen can be admitted by the regulating-valve 27 to the mixing-chamber $27^a$ as and when required to bring the hydrogen content of the gaseous mixture up to the proportion required for the reaction.

I will now proceed to describe the improved hydrogen-producer as illustrated in the drawings. This producer consists of a rectangular structure of refractory brick, with an outer metallic shell or casing and having an arched top, as shown. It is formed or provided at the base with inlet 34 for gaseous fuel for heating up the generator when required and also with another inlet, 35, for producer or water gas for reducing the oxid of iron formed in the hydrogen-producing reaction, both these inlets being provided with suitable valves $34^a$ $35^a$, Fig. 1, to enable them to be closed. It will be obvious that one such inlet would suffice; but it is in many cases convenient to have separate inlets for the heating and reducing operations. On the floor 36 of the generator I dispose a convenient number of pillars or supports 37, these being arranged at equal distances apart along and across the base of the generator, so as to support the ends of the trays for containing iron when these are superposed thereon, as described later. A combustion-chamber 38 is thus provided at the base of the generator. A valved air-inlet 39 opens through the side of the generator into the combustion-chamber 38, and a steam-inlet pipe 40, Fig. 1, is also arranged to discharge into same.

$40^a$ is a manhole for cleaning purposes provided with a suitable door.

41 represents the trays for containing the iron. These are of refractory fire-brick. They are of square shape in plan and are of I form in section, as seen in Fig. 3—that is to say, they are formed with a flange or lip at two opposite sides extending for a short distance above and below the central horizontal plane of the tray, so as to support the flanges of the tray next above and provide a channel between each pair of superposed trays for the passage of the steam or gases. These trays are filled with iron in powdered form and are piled one above another along and across the generator, the abutting corners or angles of the bottom range of trays being supported by the pillars 37, disposed, as before described, at equal distances along and across the floor of the producer. The remaining trays are built up over the bottom range of trays, each range being supported by the flanges of the trays of the row next below. The refractory fire-brick lining at the right and left hand side of the generator is formed with a vertical series of supporting-ledges 42, extending from front to back, each of these ledges being designed to support the end trays of the range next above at the side where the particular ledge is situated. Each range of trays is disposed in baffled or staggered order with respect to the range next above it, the left-hand trays of the bottom row, for example, being supported on the bottom left-hand ledge 42 and lying close against the wall of the generator, while the right-hand trays of the bottom range do not extend quite to the wall on the right-hand side. (See Fig. 2.) The right-hand end trays of the second range are then supported on the bottom right-hand support 42 and similarly lie close against the wall at that side, while the left-hand trays of this second range do not extend quite to the opposite wall, and so on to the top, this arrangement being adopted to allow for expansion of the trays when heated. The end trays of each range, which are supported by the ledges 42, are somewhat different in shape from the other trays. Their form will be seen on reference to Fig. 2, which shows some of these end trays in section. It will be seen that the flanges or lips of these trays are curved to conform to the curve of the supporting-ledges, and at the side adjacent thereto they are formed with a lip $41^a$, extending from front to back of the tray, so that when each range of trays is placed in position the heating or reducing gases or steam, as the case may be, passed through the generator is or are baffled by every succeeding range of trays at each side of the generator alternately, so that the steam or gases pass from the top of each range of trays to the top of the range next above, so as to pass over the material on same, as shown by the arrows, Figs. 2 and 3. Further, the abutting lips or flanges of the trays, which are built up, as before described, constitute vertical walls or partitions which divide the interior of the generator up into a number of independent flues or passages running in a zigzag course from back to front and from front to back alternately from bottom to top of the generator. In this way intimate contact of the steam or gases with the material on each tray is assured, and, moreover, the large quantities of heat evolved in the reaction of the producer-gas with the iron to reduce the oxid of iron is stored up and rendered available for use in the oxidation stage of the working, great economy being thus attained. Each range or course of trays is also preferably disposed in slightly-staggered order with respect to the range next above, as shown in Fig. 3, a slight space being left between the end trays of each range at the front and back alternately. In this way the trays can expand evenly without interfering with uninterrupted course of the gases, as above described.

43 is the hydrogen-outlet to the supply-pipe 26.

44 is an outlet-pipe for the waste gases obtained in the reducing stage of the working—that is to say, when producer or other reducing gas is passed through the generator to reduce the iron oxid formed in the hydrogen-producing stage. A valve 45 is provided in the outlet-pipe 44 to enable this to be opened and closed when required.

46 is a manhole adapted to be closed by a suitable door and giving access to the interior of the generator to enable the trays to be placed in position therein.

It will be understood that when the generator is first run to produce hydrogen the trays contain a suitable depth of metallic iron in finely-divided form and are piled up in position, as above explained. A convenient way of obtaining the finely-divided metallic iron is to fill the trays with oxid of iron and pile them in position in the furnace and then reduce the oxid to the metallic state by passing producer or water gas over it after it has been heated to the required temperature. When the iron is in the metallic state, valves $34^a$ 45 and air-inlet 39 are opened and the manholes, inlet 35, and valve 27 are closed. Water-gas or other gaseous fuel at a high temperature is admitted by the inlet 34. The gaseous fuel on meeting the air in the base of the generator is ignited and the hot products of combustion rise through the trays, thus heating them to a high temperature, the heat being absorbed and stored by the fire-brick trays and filling. When the interior of the generator has thus been heated to a sufficient temperature, the gas-inlet 34, air-inlet 39, and valve 45 are closed and valve 27 is opened. Steam, preferably superheated, is turned on by the pipe 40 and circulates around the trays, oxidizing the iron thereon, the resulting hydrogen passing away by the pipe 26. In order to revivify the iron, valve 27, inlet 34, and air-inlet 39 are closed and valve 45 is opened. Producer or water gas is then admitted by inlet 35 and in its passage around the trays reduces the iron oxid thereon, the waste gases passing away to a chimney or uptake by the valve 45. If necesssary, the generator may be heated up in the manner above described before passing the producer or water gas therethrough to revivify the iron.

I make no claim in the present application to the process of gas manufacture hereinbefore described, as such process forms the subject of Letters Patent No. 738,303, dated September 8, 1903, issued to Ernest Henry Williamson and myself, nor do I make any claim in the present application to the specifical form or embodiment of hydrogen-generator herein described, this forming the subject of an application for patent divisional hereof and filed on March 21, 1904, Serial No. 199,130.

What I claim, and desire to secure by Letters Patent, is—

1. An apparatus for the manufacture of gas suitable for illuminating, heating or power purposes, comprising, in combination, (a) a water-gas plant, (b) a plant for the production of hydrogen gas, (c) a conversion-chamber for combining said gases in contact with nickel, and (d) suitable connections between said plants and said conversion-chamber, and means for regulating the operation of said plants and chamber.

2. An apparatus for the manufacture of gas suitable for illuminating, heating or power purposes, comprising, in combination, (a) a water-gas plant, (b) means for removing an oxid of carbon from water-gas, (c) a conversion-chamber for combining water-gas with hydrogen in contact with nickel, (d) suitable connections and means for regulating the operation of said parts, and (e) means for introducing hydrogen into said conversion-chamber.

3. An apparatus for the manufacture of gas suitable for illuminating, heating or power purposes, comprising, in combination, (a) a water-gas plant, (b) means for absorbing said carbon dioxid from water-gas, (c) a conversion-chamber for combining water-gas with hydrogen in contact with nickel, (d) suitable connections and means for regulating the operation of said parts, and (e) means for introducing hydrogen into said conversion-chamber.

4. An apparatus for the manufacture of gas suitable for illuminating, heating or power purposes, comprising, in combination, (a) a water-gas plant, (b) a chamber arranged to be heated and to facilitate the passing of steam over iron to produce hydrogen, (c) means for passing a deoxidizing-gas through said chamber, (d) a conversion-chamber for combining said water-gas and hydrogen in contact with nickel, and (e) suitable connections and means for regulating the operation of said parts.

5. An apparatus for the manufacture of gas suitable for illuminating, heating or power purposes, comprising, in combination, a water-gas producer, a condenser connected thereto, a carbon-dioxid absorber, connected to said condenser, means for delivering a carbon-dioxid-absorbing solution to said absorber, a heat-interchanger, a boiler wherein said solution can be regenerated by driving off by heat the carbon dioxid absorbed thereby in the absorber, conduits between said absorber and said heat-interchanger and between said boiler and said interchanger whereby said absorbent solution can be delivered from said boiler through said heat-interchanger to said absorber and the regenerated solution delivered from the absorber through said interchanger to the boiler, means for so delivering the absorbent solution to said boiler and said absorber, a conduit at the delivery side of said absorber, a hydrogen-generator, a hydrogen pipe or connection connecting said hydrogen-generator to said last-mentioned conduit whereby hydrogen may be caused to mix with the gases issuing from the absorber, a heater through which the conduit at the delivery side of the absorber passes at a point beyond its junction with the hydrogen pipe or connection, a nickel-conversion chamber into which said last-mentioned conduit delivers, said chamber containing metallic nickel, all substantially as described.

6. An apparatus for the manufacture of gas suitable for illuminating, heating or power purposes comprising, in combination, a water-gas producer, a condenser connected thereto a carbon-dioxid absorber, connected to said condenser, means for delivering a carbon-dioxid-absorbing solution to said absorber, a heat-interchanger, a boiler wherein said solution can be regenerated by driving off by heat the carbon dioxid absorbed thereby in the absorber, conduits between said absorber and said heat-interchanger and between said boiler and said interchanger whereby said absorbent solution can be delivered from said boiler through said heat-interchanger to said absorber and the regenerated solution delivered from the absorber through said interchanger to the boiler, means for so delivering the absorbent solution to said boiler and said absorber, a conduit at the delivery side of said absorber, a heater through which the conduit at the delivery side of the absorber passes, a nickel-conversion chamber into which said last-mentioned conduit delivers, said chamber containing metallic nickel, all substantially as described.

7. An apparatus for the manufacture of gas suitable for illuminating, heating or power purposes, comprising, in combination, a water-gas producer, a condenser connected thereto, a conduit at the delivery side of said condenser, a hydrogen-producer, a hydrogen pipe or connection connecting said hydrogen-producer to said conduit whereby hydrogen may be caused to mix with the gases issuing from the condenser, a heater through which said conduit passes at a point beyond its junction with the hydrogen pipe or connection and a nickel-conversion chamber to which said conduit delivers, said chamber containing metallic nickel all substantially as described.

8. An apparatus for the manufacture of gas suitable for illuminating, heating or power purposes, comprising, in combination, (a) a water-gas plant, (b) a plant for producing hydrogen gas, (c) a conversion-chamber for combining the carbon monoxid of said water-gas with hydrogen in contact with nickel, (d) a second conversion-chamber for converting the carbon dioxid of said water-gas with hydrogen in contact with nickel, and (e) suitable connections and means for regulating the operation of said parts.

9. An apparatus for the manufacture of gas suitable for illuminating, heating or power purposes, comprising, in combination, a water-gas producer, a condenser connected thereto, a conduit at the delivery side of said condenser, a hydrogen-producer, a hydrogen pipe or connection connecting said hydrogen-producer to said conduit whereby hydrogen may be caused to mix with the gases issuing from the condenser, a heater through which said conduit passes at a point beyond its junction with the hydrogen pipe or connection and a nickel-conversion chamber to which said conduit delivers, said chamber containing metallic nickel, a second heater, a second nickel-conversion chamber containing metallic nickel and a conduit adapted to deliver the gases issuing from said first nickel-chamber through said second heater to said second nickel-chamber, substantially as described.

In witness whereof I have hereunto signed my name in the presence of two subscribing witnesses.

HERBERT SAMUEL ELWORTHY.

Witnesses:
WALTER J. SKERTEN,
GEO. J. B. FRANKLIN.